United States Patent [19]

Bean, Jr.

[11] Patent Number: 4,764,572

[45] Date of Patent: Aug. 16, 1988

[54] ANIONIC POLYMERIZATION PROCESS

[75] Inventor: Arthur R. Bean, Jr., Houston, Tex.

[73] Assignee: Shell Oil Company, Houston, Tex.

[21] Appl. No.: 758,182

[22] Filed: Jul. 23, 1985

[51] Int. Cl.$^4$ .......................... C08F 4/48; C08F 36/06; C08F 36/08
[52] U.S. Cl. .......................................... 526/87; 526/78; 526/173; 526/175; 526/335; 526/337; 526/340; 525/95; 525/98; 525/242; 525/250; 525/314
[58] Field of Search ...................... 526/63, 79, 87, 335, 526/337, 340, 346, 173, 175, 78; 525/242, 250, 314, 95, 98

[56] References Cited

U.S. PATENT DOCUMENTS

| Re. 27,145 | 6/1971 | Jones | 526/340 |
|---|---|---|---|
| 3,248,377 | 4/1966 | Arnold et al. | 526/87 X |
| 3,356,763 | 12/1967 | Dollinger et al. | 526/65 |
| 3,449,306 | 6/1969 | Zelinski | 526/87 |
| 3,488,332 | 1/1970 | Hirosku et al. | 526/78 |
| 3,687,913 | 8/1972 | Hoshino et al. | 526/87 |
| 3,801,555 | 4/1974 | Johnson | 526/65 |
| 4,239,870 | 7/1979 | Smith | 526/77 |
| 4,371,661 | 2/1981 | Nicholson | 526/65 |
| 4,390,663 | 2/1981 | Nicholson | 526/65 |
| 4,480,075 | 10/1984 | Willis | 525/247 |
| 4,530,966 | 7/1985 | Shiraki et al. | 525/314 X |

FOREIGN PATENT DOCUMENTS

| 2012 | 11/1977 | European Pat. Off. | 525/247 |
|---|---|---|---|
| 2011561 | 3/1969 | Fed. Rep. of Germany | 526/64 |
| 2134656 | 7/1970 | Fed. Rep. of Germany | 526/65 |
| 7132415 | 9/1971 | Japan | 525/314 |

OTHER PUBLICATIONS

G. R. Meira, "Polymer Engineering and Sci.," 21(7) pp. 415–423 (1981).

Primary Examiner—Joseph L. Schofer
Assistant Examiner—F. M. Teskin
Attorney, Agent, or Firm—Richard F. Lemuth

[57] ABSTRACT

This invention provides an improvement in anionic polymerization processes which comprises both a batch polymerization step to form and partially grow living polymer chains and a subsequent continuous or semi-continuous step in which growth of the chains is continued. For purposes of this improvement, the transition to the continuous or semi-continuous step takes place before the molar concentration of monomer in the batch polymerization step is depleted to a level below that of the living chains. Anionic polymerization processes are recognized as particularly useful for the production of polymers having narrow molecular weight distributions. Practice under the invention is found to enhance the narrow distribution of the polymer product by controlling thermal die-out of chains which has occurred in conventional processes during the transition from batch to continuous or semi-continuous polymerization steps.

5 Claims, No Drawings

4,764,572

ANIONIC POLYMERIZATION PROCESS

BACKGROUND OF THE INVENTION

This invention relates to an improved polymerization process. More particularly, this invention relates to an improvement in processes which comprise an initial batch polymerization reaction and a subsequent semi-batch or continuous reaction, with both reactions carried out under an anionic polymerization mechanism.

A variety of valuable synthetic thermoplastic rubber products are conventionally produced by the anionic polymerization of monomers such as conjugated dienes, alkenyl aromatic compounds and activated mono-olefins. Anionic polymerization is characterized by the initiation and propagation of what are commonly termed living polymer chains. When the chains are initiated at substantially the same time and grow at substantially the same rate, the polymerization reaction yields a product having a very narrow molecular weight distribution. The molecular weight of each individual polymer chain is relatively close to the average molecular weight of the overall product, i.e., the total weight of the monomer(s) consumed divided by the moles of initiator used. Uniformity of the polymer molecules in the products of anionic polymerization is an important factor from the standpoint of many of the desirable physical properties of the materials.

In the practice of anionic polymerization processes, it is often the case, however, that a portion of the living polymeric chains are terminated before they reach their desired, or "target", molecular weight. Moreover, because these terminated chains do not reach their target molecular weight, the polymerization mixture contains an excess of monomer which was intended for reaction with the terminated chains. This excess monomer adds onto the remaining live chains to form chains having a molecular weight higher than that originally targeted. The net effect of chain termination is then a broadening of the molecular weight distribution of the product both below and above the target.

It is recognized in the art that the principal mechanisms for chain termination in anionic polymerization are (i) a reaction between the active anionic polymerization site of the living chain and one or more impurities in the polymerization system, and (ii) thermal die-out of the active site at the higher polymerization temperatures, e.g., temperatures greater than about 50° F. Termination via the impurities reaction can usually be avoided or at least controlled within acceptable limits by maintaining the purity of the monomer, polymerization initiator, and diluent in the polymerization mixture. Termination via thermal die-out, which is thought to involve the elimination of the living anionic site from the chain through a reaction forming a hydride, is in many cases more difficult to bring under control.

It is the principal object of this invention to minimize the incidence of chain termination reactions in certain anionic polymerization processes, particularly termination which can be attributed to a thermal die-out mechanism.

The invention is particularly intended for application to anionic polymerization processes which are initiated in a batch mode, and then subsequently continued in a continuous (or semi-continuous) mode. Such processes are well known in the art and are in common commercial practice. For the batch mode process step, predetermined amounts of (i) one or more monomers suitable for anionic polymerization and (ii) an anionic polymerization initiator, are contacted to form and propagate the living polymeric chain. This step is strictly a batch operation in the sense that all monomer and all initiator are brought into contact at the same time; no further addition of monomer or initiator takes place during this step, nor is any removal made from the contact mixture of polymerization product. The relative proportions of monomer and initiator used in this step are such that the chains do not reach their target molecular weight in the batch step alone, and polymerization is subsequently continued (with the same and/or different monomer) in a second step which is operated in a continuous or semi-continuous mode. This second reaction step is termed continuous in the sense that monomer is added (continuously, or also suitably intermittently) to the reaction mixture as the polymerization proceeds. However, no removal of product is made until the chains reach the target molecular weight.

SUMMARY OF THE INVENTION

It has now been found that, as they are conventionally practiced, anionic polymerization processes which comprise a batch polymerization step followed by a continuous polymerization step provide an unexpected opportunity for premature chain termination by the thermal die-out mechanism.

More particularly, it has been observed that thermal die-out is not only the result of elevated temperatures within the exothermic polymerization mixture. In certain limitd circumstances, the thermal die-out mechanism has now been found to be a function of the concentration of unreacted monomer in the mixture. At temperatures above about 50° C., the rate of occurrence of termination by thermal die-out is markedly increased when monomer concentration in the mixture is reduced below certain levels. In conventional anionic polymerization processes having a batch step followed by a continuous step, it has been the practice to continue the batch step until substantially all of the monomer in the mixture has been depleted before commencing additional monomer addition in the continuous step. Monomer depletion at the conclusion of the batch step in this anionic polymerization process has now been identified as a major factor contributing to chain termination reactions.

Accordingly, the present invention is briefly described as an improvement upon conventional anionic polymerization processes which comprise steps for (a) contacting and reacting in a batch mode a charge of monomer suited for anionic polymerization and a charge of anionic polymerization initiator, to form and grow living anionic polymer chains and (b) subsequently contacting and reacting the polymer chains formed in step (a) with additional monomer which is added in a continuous (or semi-continuous) manner to continue growth of the chains. The improvement specifically comprises reacting monomer in the batch mode according to step (a) only so long as, and commencing addition of monomer for practice of step (b) while the molar ratio of unreacted monomer to initiator charge remains at least as great as 1:1. In other words, the invention entails ending the batch polymerization step (a) by adding additional monomer to commence the subsequent continuous (or semi-continuous) polymerization step (b) before the monomer concentration is depleted to a level which, on a molar basis, is less than the concentration of the charge of the polymerization initiator. In most typical practice, this requirement will entail continuing the batch step to a conversion of at least about 95.0 percent but not greater than about 99.9 percent of the original monomer charge.

Under prior art practices, the dependence of the thermal die-out mechanism upon monomer content has not been appreciated and as a result the monomer content of the batch polymerization step has not been closely monitored. However, in typical operation of such processes, transition from the batch step to the continuous step has generally been effected only after the monomer content of the batch reaction was essentially depleted, e.g., to a molar concentration level substantially less than that of the initiator charge, and very typically after a monomer conversion in excess of 99.99 percent. Essentially complete depletion of monomer in the batch reaction in practice according to the prior art has proved to be convenient to process operations from the standpoint of monitoring and controlling the temperature of the exothermic polymerization system. There is the risk in such a process, if the second reaction step is commenced by addition of monomer to the polymerization system while a large quantity of monomer remains unconverted by the first, batch reaction step, that the rate of heat release may exceed the capabilities of the system for heat removal, resulting in higher than desired temperatures and possible degradation of the product. Complete depletion of monomer has also been used in the prior art as a means of preventing the formation of a "tapered" polymer block in cases of block copolymer preparation in which the continuous step involves a different monomer than that of the batch step.

The performance of the invention with respect to minimizing the incidence of thermal die-out in this process and thereby improving the polymer product quality is considered unexpected in view of reports in the art, for instance that of U.S. Pat. No. 3,687,913, that the occurrence of chain termination reactions in anionic polymerization at elevated temperature is not affected by the concentration of the monomer in the reaction mixture.

DESCRIPTION OF THE PREFERRED EMBODIMENTS

The process of this invention is intended for application only to anionic polymerization processes, and only to processes in which the anionic polymerization of one or more monomers is commenced in a batch reaction step and thereafter continued in a reaction step characterized by operation in a continuous (or semi-continuous) mode. The process improvement of the invention specifically centers upon operations made in connection with the transition from the batch reaction step to the continuous reaction step. As a general rule, apart from practices in connection with such transition, the invention is suitably practiced under conditions and procedures well known in the anionic polymerization art.

In this respect, the invention is suitably applied to any one or more monomers which are susceptible to anionic polymerization. Useful monomers are known to include conjugated dienes, alkenyl aromatics, activated alpha-olefins, and the like. Preferred conjugated dienes are those having from about 4 to 12 carbon atoms per molecule, while the polymerization of conjugated dienes having 4 or 5 carbon atoms is generally of greatest commerical interest. Specific examples of preferred conjugated diene monomers are 1,3-butadiene, isoprene, 2,3-dimethyl-1,3-butadiene, 2-methyl-1,3-pentadiene, 2,3-dimethyl-1,3-pentadiene, 2-methyl-3-ethyl-1,3-pentadiene, and 2-phenyl-1,3-butadiene. Preferred alkenyl aromatic monomers are the vinyl-substituted aromatic hydrocarbons such as styrene, 1-vinylnaphthalene, 2-vinylnaphthalene, 3-methylstyrene and the alkyl, cycloalkyl, aryl, aralkyl, and arylalkyl derivatives thereof in which the the total number of carbon atoms in the combined substituents is generally no greater than about 12. Additional specific examples of such aromatic monomers include 3-methylstyrene, 3,5-diethylstyrene, 4-cyclohexylstyrene, 2,4,6-trimethylstyrene, 4-phenylstyrene, 2-ethyl-4-benzylstyrene, 4,5-dimethyl-1-vinylnaphthalene, 3,6-di-p-tolyl-1-vinylnaphthalene, 7-decyl-2-vinylnaphthalene, and the like. Other monomers suitable for anionic polymerization include, for example, acrylic and methacrylic esters, methyl vinyl ketones, vinylidene esters, nitroethylenes, and vinylidene cyanide, acrylonitrile and related cyano derivatives. From the standpoint of commercial interest, the invention is very advantageously applied to processes wherein the monomer or monomers used in both step (a) and step (b) is selected from the group consisting of butadiene, isoprene, styrene, and mixtures thereof.

In one embodiment of the specification, the monomer reacted in step (a), i.e., the "first monomer", is a different monomer from that reacted in step (b), i.e., the "second monomer".

The polymerization initiators (also termed polymerization catalysts) suitably employed in the invention are likewise those which the art generally recognizes for anionic polymerization service. In general terms the initiator in any given process application is typically one or more alkali metals or organic alkali metal derivatives, preferably one or more organolithium compounds, and more preferably one or more monolithium compounds. Such initiators can, in the case of the monolithium compounds, be represented by the formula RLi or ROLi, wherein R is a hydrocarbon radical which can be aliphatic, cycloaliphatic, or aromatic. The carbon number of the hydrocarbon radical is not limited insofar as operability is concerned, although those of up to about 20 carbon atoms are generally preferred from the standpoint of availability. Aliphatic monolithium initiators form a particularly preferred class, including, for example, the specific compounds n-butyllithium, sec-butyllithium, t-butyllithium, n-decyllithium, eicosyllithium, lithium methoxide, and lithium ethoxide. Examples of aromatic initiators include phenyllithium, 1-naphthyllithium, and p-tolyllithium. Cycloaliphatic monolithium initiators are exemplified by cyclohexyllithium and the like. Mixtures of initiators are very suitable.

Still further, as is generally the case in the art, anionic polymerization in accordance with the invention is suitably carried out in the presence of an essentially inert diluent, comprising, for example, one or more diluents selected from the class consisting of alkanes, cycloalkanes, alkenes, and aromatic solvents. Specific examples of suitable diluents include propane, isobutane, n-pentane, n-hexane, n-heptane, isooctane, n-decane, cyclopentane, cyclohexane, methylcyclohexane, benzene, toluene, xylene, naphthalene, and the like. Diluent is typically used in a quantity such that the weight ratio of diluent to total monomer is in the range from about 1:1 to 25:1, preferably in the range from about 5:1 to 10:1.

In the batch reaction step of the invention, the monomer, initiator and diluent are charged to a reactor which is equipped with means for stirring or otherwise agitating the polymerization mixture. The quantity of initiator charged to the reactor will determine the number of living polymer chains which form. The relative proportions of initiator and monomer charged will determine the molecular weight of the chains resulting from this process step. Preferably, the charge to the batch reactor has a molar ratio of monomer to initiator which is in the range from about 40:1 to 10,000:1.

For purposes of applying the invention as an improvement in such an anionic polymerization process, the batch polymerization step is, in whole or in part, necessarily conducted at a temperature of at least about 50° C. Specifically, it is the point in the operation of the process at which the batch reaction reaches a high level of monomer conversion e.g., 95 percent or more, and is then discontinued by addition of monomer to commence the subsequent semi-batch or continuous step, that a temperature of a least 50° C. is critical. Only at temperatures in excess of about 50° C. does the thermal die-out mechanism become a significant cause of polymer chain termination. In one typical case, contact between the components for the batch polymerization step is commenced at a relatively low temperature, e.g., 30° C. Temperature in the polymerization mixture then increases to levels greater than 50° C., and very often to substantially greater levels, as the exothermic polymerization proceeds. It is also important to note with reference to this specification for process temperature that the invention is intended for application whenever local temperature in the polymerization mixture exceeds the 50° C. level, even though the average bulk temperature may be less than 50° C.

The invention is responsible for still greater improvement, in terms of inhibiting chain termination, at temperatures greater than 50° C. In this regard, the invention is more beneficially applied to processes in which the batch polymerization temperature is at least about 65° C., and is still more beneficial in processes having a batch step in which temperature is at least about 85° C. Particular advantage is found in applying the invention to processes in which the batch polymerization step temperature reaches at least about 95° C., at the point of transition to the continuous or semi-continuous step.

It is critical to the object of the invention for controlling chain termination by thermal die-out that polymerization in the batch mode not be continued beyond the point at which the number of molecules of unconverted monomer in the batch polymerization mixture remains at least as great as the number of living polymer chains in that mixture. In other words, it is necessary to maintain in the batch polymerization reaction mixture a content of unreacted monomer which does not fall below a level of about 1 mole of monomer for each mole of the living polymer chains. Since the number of moles of living polymer chains is substantially equal to the number of moles of anionic polymerization initiator charged to the system, this requirement is alternatively, and more conveniently, expressed in terms of maintaining in the batch step a molar ratio of unreacted monomer to original initiator charge which is at least about 1:1. The subsequent continuous or semi-continuous polymerization is commenced, by addition of further quantities of monomer to the mixture, before the molar ratio falls below this 1:1 value. The occurrence of thermal die-out reactions is now found to be markedly increased in reaction mixtures in which this ratio is allowed to fall significantly below this level.

Still higher levels of monomer concentration are preferred in order to better inhibit the onset of increased thermal die out. For instance, it is preferably that the monomer addition for the semi-continuous or continuous polymerization step be commenced before the monomer level falls below a 2:1 ratio of moles of monomer to moles of initiator, more preferably before this ratio falls below about 4:1, and most preferably before this ratio falls below about 10:1.

Although not strictly necessary to the practice of the invention, it is also generally preferable that the semi-continuous or continuous polymerization step of the invention not be commenced too early in the process. If substantial quantities of unconverted monomer remain in the batch reaction mixture at the time when addition is made of further quantities of monomer, there is the danger of increasing the rate of reaction and the rate of heat generation and temperature build-up to unacceptable levels. It would also be undesirable in many cases to commence addition in a continuous or semi-continuous step of a monomer different from that remaining unconverted from the batch step. For such reasons it is generally desirable that the continuous or semi-continuous process step not be initiated before the monomer concentration falls to a level such that the molar ration of monomer to initiator charge is less than about 100:1, more preferably not until this ratio is less than about 50:1, and most preferably not until this ratio is less than about 20:1.

In many applications of this invention, these broader levels of remaining monomer concentration will correspond to continuing the batch step to conversions of the initial monomer charge which are in the range from about 95.0 to 99.9 percent. Conversions of monomer in the range from about 98 to 99.9 percent are common in more preferred operations under the invention, while conversions is the range from about 99.0 to 99.8 percent are typical of the application of the invention to many particularly desirable operations.

As will be understood by those skilled in the art, the progress of such batch polymerization reactions, e.g., in terms of the concentration of unreacted monomer, is often monitored by calculations based on known or predetermined reaction rates for the particular materials and conditions employed and by measurements of the rate of temperature change in the polymerization mixture, rather than on the basis of actual measurements of concentration in the ongoing reaction. Such methods of reaction monitoring and control have proved very useful in practice of this invention.

The requirement for maintaining unreacted monomer in the polymerization mixture during operation at temperatures of 50° C. or more is, for purposes of this invention, satisfied by ending practice of the batch step before it depletes monomer to a concentration below the level associated with the desired ratio of monomer to initiator charge. The batch step ends, and the continuous (or semi-continuous) step begins with addition to the reactor of a quantity of monomer beyond that initially charged to the batch reactor.

In the subsequent continuous or semi-continuous polymerization step, monomer (either the same monomer as, or a different monomer from that polymerized in the batch step) is added either intermittently or continuously to continue the growth of the living chains resulting from the batch step. As the term semi-continuous is used herein, it is intended to describe a process step in which monomer is intermittently or continuously added to and mixed with the living polymer chains in the polymerization reactor, for example, a single well-mixed vessel, if desired, the same reactor used in the batch step. The monomer is added to the mixture until the polymer chains reach a target molecular weight, and only then is monomer feed discontinued and product withdrawn. The term continuous, on the other hand, is intended to describe a steady state process in which there is essentially no change over time in the composition of the feed or exit streams from the reactor. A continuous anionic polymerization step is exemplified by passing the mixture resulting from the batch step, together with additional monomer, through a plug-flow tubular reactor. Procedures for carrying out anionic polymerization in a continuous reaction mode are described, for instance, in U.S. Pat. No. 3,356,763 and the aforementioned U.S. Pat. No. 3,687,913.

If the continuous or semi-continuous polymerization step is conducted at (or to) a temperature of at least 50° C., it is preferable that the rate of monomer addition in this step be "programmed" to maintain a quantity of unreacted monomer in the reaction mixture and thereby inhibit chain termination in this step of the process as well. Maintaining monomer content at a particular level in this process step is, however, not considered to be an aspect of the invention now claimed. Still, for best results in the overall process, monomer addition in the continuous or semi-continuous step should maintain a molae ratio of unconverted monomer to total initiator charge to the system which is at least about 1:1, preferably at least about 2:1, more preferably at least about 4:1, and most preferably at least about 7:1.

Although it is suitably applied to any anionic polymerization process practiced in a two-stage (batch step and continuous or semi-continuous) manner, the invention is most advantageously applied to the preparation of block copolymers, that is, polymers wherein the molecule comprises at least two distinct blocks along the main polymer chain, each block a sequence representing the polymerization of different monomers or different types of monomers. The polymer chain may be, for example, a diblock polymer comprising two such blocks and having the general configuration A—B, a triblock polymer comprising three such blocks and having the general configuration A—B—C or A—B—A, etc. The invention is considered particularly useful in the preparation of block copolymers of the configuration A—(B—A)$_n$, wherein each A represents a monovinylarene polymer block, e.g., a polystyrene block, and each B represents a conjugated diene polymer block, e.g., a butadiene or isoprene block. Block copolymers of this type are described in more detail in U.S. Pat. No. Re. 27,145.

The invention is further illustrated by reference to the following examples which are intended to demonstrate the application of the invention in certain specific embodiments and is not intended to limit its broader scope.

EXAMPLE 1

A process in accordance with the invention was carried out as follows.

A mixture of first monomer and cyclohexane solvent was charged to a stirred reactor, followed by addition to the reactor of sec-butyllithium initiator. Temperature of the reactor was initially about 30° C. A batch polymerization reaction commenced and continued under essentially adiabatic conditions to reach a styrene conversion of about 99.8 percent. At this point second monomer and additional cyclohexane solvent were added to the batch polymerization mixture. Polymerization of the living chains then continued as temperature in the reaction rose to about 65° C. At this point, the butadiene content of the mixture had decreased to a level corresponding to about 100 moles of butadiene monomer per mole of initiator charge, and a continuous addition of butadiene was commenced. The process was continued in a semi-continuous mode, with addition of further butadiene monomer programmed to maintain a molar ratio of monomer content to initiator charge greater than 4:1.

EXAMPLE 2

The advantages of the invention with regard to controlling the occurrence of chain termination reactions in anionic polymerization are illustrated by the results of a series of four experiments.

Two of these experiments (designated A and C) demonstrate the occurrence of chain termination reactions in prior art practice of anionic polymerization in a batch mode. The other two experiments (B and D) illustrate the advantages of the invention in the control of chain termination.

For experiment A, 0.16 g moles of the polymerization initiator sec-butyllithium was charged to a jacketed stainless steel stirred reactor, together with about 8,000 g of butadiene. The mixture was allowed to react at a constant controlled temperature of 85° C. in a batch mode (i.e., without further addition of initiator or monomer or withdrawal of polymer product) for 25 minutes, during which the reaction reached a conversion of monomer calculated to be approximately 99.991 percent. Another 8,000 g of butadiene monomer was then added to the mixture and the polymerization was allowed to continue for an additional 15 minutes before the reaction was terminated by addition of alcohol to the mixture. The resulting product was then analyzed by gel permeation chromatography (GPC) to determine the quantity of thermal die-out chain fragments. Overall, the initiator (0.16 g moles) and the monomer (16,000 g) were charged to the reactor in relative quantities designed to yield a target molecular weight for the product of about 100,000. The product analysis indicated, however, that about 6.6 percent of the living chains had been terminated (at a molecular weight of about 50,000) at the end of the initial 25 minutes batch reaction, when the molar ratio of unreacted monomer to original initiator charge was permitted to fall to about 0.08:1.

In experiment B, the reactor was again charged with 0.16 g moles of initiator and a total of about 16,000 g of butadiene monomer. In this case, however, the monomer was added to the reactor continuously over a total of 30 minutes reaction time, in order to prevent depletion of monomer to undesirable levels at any time during the reaction, i.e., to maintain a molar ratio of unreacted monomer to initiator charge which is at least about 1:1. The mixture was then maintained at 85° C. for an additional 10 minutes to consume all monomer. Analysis of the product after the total of 40 minutes reaction at 85° C. indicated that only about 1.0 percent of the chains has undergone termination at less than the target molecular weight. A comparison of the results of experiments A and B illustrates the influence of monomer concentration in the polymerization mixture upon the thermal die-out mechanism of chain termination.

Experiments C and D were similar to A and B respectively, although run at higher temperature (95° C.). In Experiment C, the reactor was charged with 0.16 moles of the sec-butyllithium initiator and 8,000 g of the butadiene monomer. The mixture was batch reacted to essentially complete (99.999998 percent, calculated) conversion of monomer over a period of 25 minutes. Addition was then made of a further 8,000 g of monomer and the reaction continued to a total time of 15 minutes. Target molecular weight was again about 100,000. Analysis of the product of experiment C indicated that chain termination had occurred in about 13.6 percent of the polymer molecules at a molecular weight of about 50,000, at the time when monomer was depleted to a very low level, i.e., a molar ratio of unreacted monomer to initiator charge of about 0.00002:1.

In experiment D, a total of 6,800 g of butadiene was charged continuously (377 g per minute) over the course of 18 minutes to the reactor containing the 0.068 moles of initiator, in order to prevent monomer depletion to undesirable levels. Analysis of the product showed that only about 2.0 percent of the molecules had undergone chain termination at a molecular weight substantially below the target of 100,000. Comparison of the results of experiments C and D again illustrates the importance of maintaining monomer in the polymerization mixture as a means to inhibit thermal die-out and chain termination.

These experiments also confirm that it is the thermal die-out mechanism which is responsible for the chain termination at low concentrations of monomer in the anionic polymerization mixture and which is inhibited by operating without depletion of monomer. For both the batch and continuous additions of butadiene, the percentage of die-out fragments found after reaction at 95° C. is about twice that found after reaction at 85° C.

I claim as my invention:

1. In an anionic polymerization process for the preparation of block copolymers which comprises steps for
   (a) contacting and reacting in a batch mode and at a temperature of at least about 50° C. a charge of a first monomer selected from the group consisting of butadiene, isoprene, styrene, and mixtures thereof and a charge of anionic polymerization initiator, and
   (b) subsequently contacting and reacting in a continuous or semi-continuous mode the product of step (a) with a charge of a second monomer selected from the group consisting of butadiene, isoprene, styrene, and mixtures thereof, said second monomer being a different monomer than the said first monomer, to continue the anionic polymerization reaction, the improvement which comprises commencing continuous or semi-continuous step (b) by addition of the second monomer to the product of batch step (a) when the first monomer conversion in step (a) reaches a level between about 99 and 99.9 percent, and while the molar ratio of the unreacted first monomer in step (a) to the initiator charge to step (a) remains at least about 1:1.

2. The process of claim 1, wherein step (b) is commenced while the molar ratio of unreacted first monomer to initiator remains at least about 2:1.

3. the process of claim 2, wherein step (b) is commenced while the molar ratio of unreacted first monomer to initiator remains at least about 4:1.

4. The process of claim 1, wherein the first monomer is styrene and the second monomer is butadiene.

5. The process of claim 2, wherein the first monomer is styrene and the second monomer is butadiene.

* * * * *